United States Patent
Lindoff et al.

(10) Patent No.: US 7,656,850 B2
(45) Date of Patent: Feb. 2, 2010

(54) METHOD AND APPARATUS FOR ACCELERATED SUPER 3G CELL SEARCH

(75) Inventors: Bengt Lindoff, Bjärred (SE); Robert Baldemair, Hägersten (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 428 days.

(21) Appl. No.: 11/531,213

(22) Filed: Sep. 12, 2006

(65) Prior Publication Data

US 2007/0091785 A1     Apr. 26, 2007

Related U.S. Application Data

(60) Provisional application No. 60/725,591, filed on Oct. 11, 2005, provisional application No. 60/725,385, filed on Oct. 11, 2005.

(51) Int. Cl.
- *H04W 4/00* (2009.01)
- *H04B 7/212* (2006.01)
- *H04J 3/06* (2006.01)

(52) U.S. Cl. .................. 370/338; 370/324; 370/350; 370/503

(58) Field of Classification Search .................. 370/338
See application file for complete search history.

(56) References Cited

U.S. PATENT DOCUMENTS

| | | | | |
|---|---|---|---|---|
| 2005/0111522 | A1* | 5/2005 | Sung et al. | 375/145 |
| 2006/0126491 | A1* | 6/2006 | Ro et al. | 370/208 |

OTHER PUBLICATIONS

Hlaing Minn; et al., "A Robust Timing and Frequency Synchronization for OFDM Systems," IEEE Transactions of Wireless Communications, vol. 2, No. 4, Jul. 2003, pp. 822-839.

* cited by examiner

*Primary Examiner*—Vincent P Harper
*Assistant Examiner*—Timothy Pham
(74) *Attorney, Agent, or Firm*—Michael G. Cameron

(57) ABSTRACT

The method and system of a first aspect of the present invention is adapted to perform cell search on all possible bandwidths. In order to reduce the search time, the order in which the allowable BW is used in the search is based on information from history lists. These history lists include the BWs and frequency bands used. A second aspect of the present invention is a method and an OFDM cellular telecommunications system adapted to perform cell search and synchronization wherein the system has a certain number of bandwidth possibilities. The method comprises the steps of identifying at least one critical system parameter that reduces the set of possible synchronization signals; and performing cell search and synchronization over the limited number of different synchronization signals.

10 Claims, 3 Drawing Sheets

METHOD AND APPARATUS FOR ACCELERATED SUPER 3G CELL SEARCH

CROSS-REFERENCE TO RELATED APPLICATIONS

This application claims the benefit of U.S. Provisional Application No. 60/725,591 and U.S. Provisional Application No. 60,725,385, both filed Oct. 11, 2005, the disclosures of which are incorporated herein by reference.

BACKGROUND

In the evolution of the mobile cellular standards such as Global System for Mobile Communication (GSM) and Wideband Code Division Multiple Access (WCDMA) new modulation techniques such as Orthogonal Frequency Division Multiplexing (OFDM) are likely to be implemented. Introducing cyclic prefix in OFDM makes it robust to delay spread and facilitates very high data rates. OFDM can be regarded as a combination of modulation and multiple-access schemes that segments a communications channel in such a way that many users can share it. Whereas TDMA segments are according to time and CDMA segments are according to spreading codes, OFDM segments are according to frequency. It is a technique that divides the spectrum into a number of equally spaced tones. OFDM then carries a portion of a user's information on each tone. A tone can be thought of as a unique frequency in which each tone is orthogonal with every other tone. FDM typically requires there to be frequency guard bands between the frequencies so that they do not interfere with each other. OFDM allows the spectrum of each tone to overlap, and because they are orthogonal, they do not interfere with each other. By allowing the tones to overlap, the overall amount of spectrum required is reduced. In OFDM, information is modulated onto a tone by adjusting the tone's phase, amplitude, or both. An OFDM system takes a data stream and splits it into N parallel data streams, each at a rate 1/N of the original rate. Each stream is then mapped to a tone at a unique frequency and combined together using the Inverse Fast Fourier Transform (IFFT) to yield the time-domain waveform to be transmitted.

In order to smoothly migrate the existing cellular systems to the new high capacity high data rate system in existing radio spectrum, a new system has to be able to operate on a flexible BW. A proposal for such a new flexible cellular system is Super 3G (S3G), also known as long term evolution of 3GPP (3GPP LTE) that can be seen as an evolution of the 3G WCDMA standard. S3G will likely use OFDM and will be able to operate on bandwidths spanning from 1.25 MHz to 20 MHz. Furthermore, S3G should also be able to work in micro cells, having a radius of about 10 meters, as well as macro cells, having a radius of about 10-100 kilometers. Data rates of up to 100 Mb/s will be possible in the high bandwidth, micro cell system case. In order to achieve those rates, it is anticipated that a different cyclic prefix scheme would be implemented in S3G. There would be one long cyclic prefix used for macro cells with a large delay spread, thereby increasing the overhead and reducing the maximum data rate, and one short cyclic prefix used in small cells, with small multi-path components, thereby decreasing the overhead and increasing the maximum data rate.

The flexibility of the S3G system will introduce new challenges to mobile terminal and user equipment (UE) (referred to collectively as "mobile terminal(s)") design. For instance, the variable bandwidth and different cyclic prefix will impose new requirements on cell search and mobility procedures. In existing cellular systems, such as WCDMA and GSM, a fixed bandwidth is used. A cell search procedure in such system operates as following:

1. For each carrier frequency, receive and down-convert the signal to a baseband signal with bandwidth (BW) (equal to the BW of the cellular system (200 kHZ GSM/5MHz WCDMA) and perform cell search by searching for the cellular system's particular synchronization channels (GSM: FCH, SCH bursts; and WCDMA: P-SCH, S-SCH channels);
2. If a cell is found, correct the carrier frequency (if initial cell search and the terminal local oscillator is not locked to the cellular systems); and
3. Detect cell ID and read the broadcast channel (BCH) and, if the terminal is allowed, camp on the cell (in idle mode) or include the cell in the neighboring set (if active mode).

The search time for the first stage above can be reduced by using a history list (initial cell search) or neighbor list (cell search in active/idle mode) in order to provide a priori knowledge about the used carrier frequencies. This procedure is discussed in Applicant's co-pending U.S. patent application Ser. No. 10/315,710. A conventional synchronization (cell search) procedure for an OFDM system (like WLAN) having a fixed bandwidth and fixed cyclic prefix length is as follows:

1. For each carrier frequency, receive and down-convert the signal to a baseband signal with bandwidth corresponding to the OFDM system bandwidth and slot timing (i.e. SCH channel);
2. Perform coarse frequency correction;
3. Perform fine frequency synchronization (e. g. using the knowledge of the cyclic prefix length);
4. Detect the cell ID and Read broadcast; and
5. Camp on the cell.

An in-depth discussion of the cell search procedure for a fixed BW OFDM system can be found at Minn, et al., "A Robust Timing and Frequency Synchronization for OFDM Systems", IEEE Transactions on Communications, Vol. 2 No 4, Jul. 2003 ("Minn"). These conventional cell search solutions cannot be directly applied to S3G as S3G has a variable bandwidth and cyclic prefix. What is desired, then, is a fast and accurate cell search procedure for cellular OFDM systems having variable bandwidth and cyclic prefix.

SUMMARY

The method and apparatus of a first aspect of the present invention is directed to the performance of a cell search on all possible bandwidths (BWs). In order to reduce the search time, the order in which the allowable BW is used in the search is based on information from history lists. These history lists include the BWs and frequency bands used. Typically in a 3G band, the BW is 5 MHz or a multiple of 5 MHz, while in the GSM band, the BW is 200 kHz. In the GSM to S3G migration scenario, the BW will likely be below 5 MHz. That is, in GSM spectrum (for instance the GSM 900), operators will slowly migrate from GSM to 3GPP LTE, hence they will first allocate a small part of the spectrum to 3GPP LTE when the number of GSM terminals are still large (and hence a large part of the spectrum needs to be occupied by GSM carriers for capacity reasons), and the when GSM is phased out the BW will be increased. Furthermore, in new bands allocated to S3G, a large BW (10-20 MHz) will most likely be used. Furthermore, the cyclic prefix length must be blindly estimated. The cyclic prefix length can be estimated after slot timing and coarse frequency correction is made.

While it is technically feasible to perform synchronization and cell search in an OFDM system supporting multiple bandwidths by performing the synchronization algorithm across all possible bandwidths, such approach is time consuming, especially for the first synchronization. Thus, a second aspect of the present invention is therefore directed toward identifying first critical system parameters that limit, prefererably to one, the number of possible synchronization signals. Once the critical system parameters are known, the synchronization procedure can be limited to this reduced set, preferably one, of all possible synchronization signals.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

Figure 1:
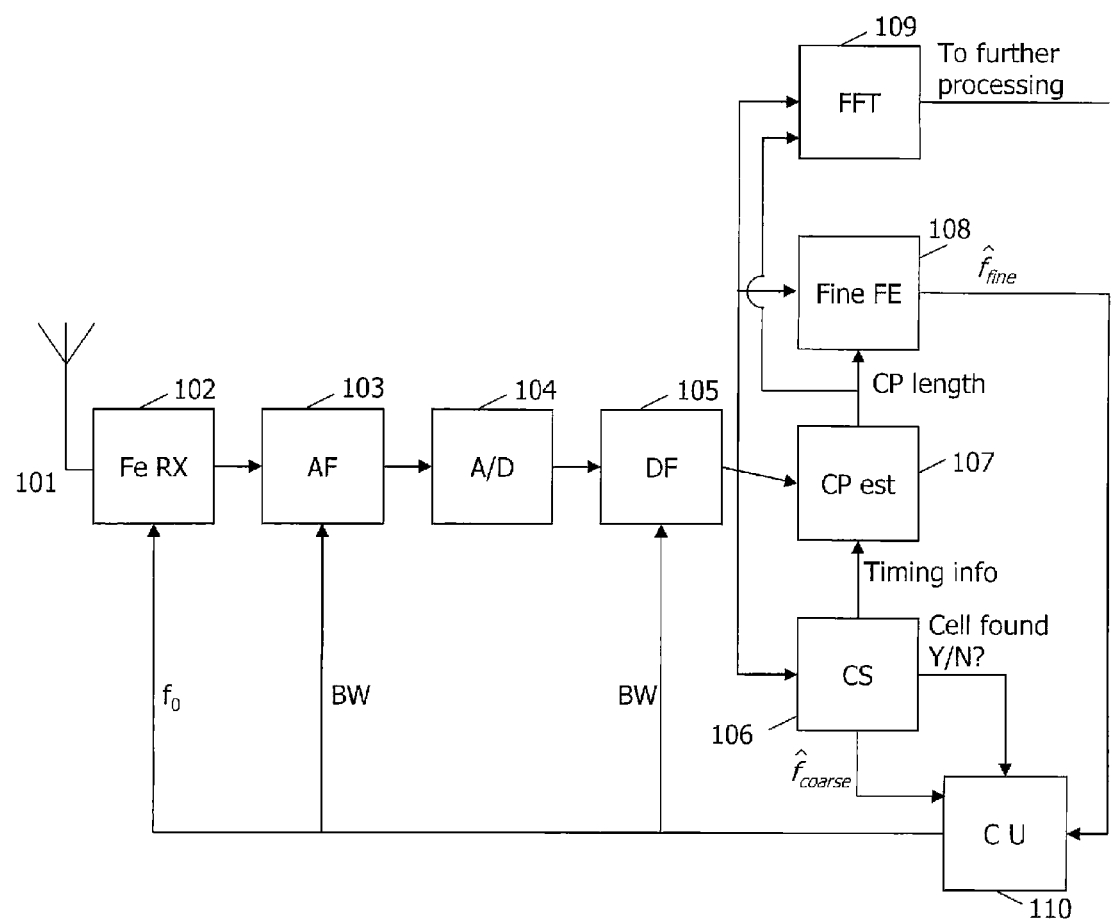
FIG. 1 is a block scheme of a mobile terminal capable of performing cell search according to a first aspect of the present invention.

FIG. 1 provides a block scheme of a mobile terminal capable of doing cell search according to a first aspect of the present invention. Referring to FIG. 1, front end receiver 102, down converts a radio signal received at least at a first antenna 101 to a baseband signal. Analog filter 103 (AF) filters the desired signal and analog to digital (A/D) converter 104 converts the baseband signal into a digital signal for further processing and digital filter 105 (DF), filters the digital signal. CS cell search block 106, is operable to determine if a cell is found according to the flow chart of FIG. 2. Cyclic prefix (CP) length estimator 107, estimates the length of the CP. Fine FE block 108, estimates the residual frequency error, and FFT processor 109, converts the time signal to a frequency domain signal.

Figure 2:
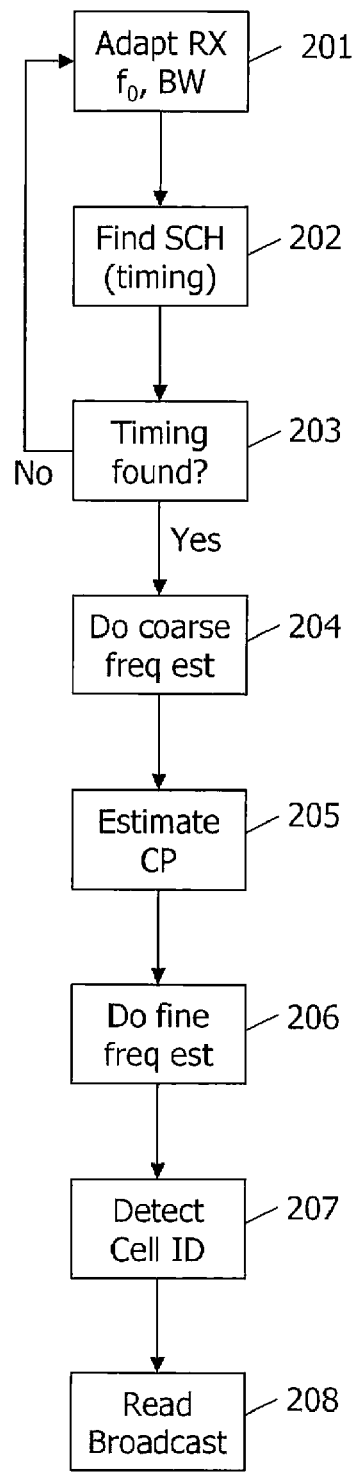
FIG. 2 is a flow chart of the cell search procedure of a first aspect of the present invention.

FIG. 2 provides a flow chart of the cell search procedure performed by the apparatus of FIG. 1. The following description is directed to the initial cell search procedure, i.e., when a mobile terminal (having a receiver and a transmitter) is not synchronized with the network, however the method of this first aspect of the present invention is not limited to that situation. Assume a S3G OFDM system with a number of possible bandwidths, for example 1.25, 2.5, 5, 10, 15 and 20 MHz, and a number of cyclic prefix lengths. The mobile terminal is turned on and the search for OFDM cells in a certain frequency band ($f_0$) is started. The receiver is first adapted to one of the possible BWs by adapting the analog filters and digital filters (AF/DF) to the specific BWs. In an embodiment of the present invention, the BW over which to start the cell search is based on historical information, for example the BW used the last time the mobile terminal was on, or based on information about which frequency band is currently being used and system knowledge. Typically, if the OFDM system is located in a 3G band, the BW is likely to be 5 MHz or a multiple of 5 MHz. This is because WCDMA uses 5 MHz BWs and operators have a fixed number of WCDMA carriers in their spectrum (15-20 MHz). However, in a GSM to S3G migration scenario, it is likely the BW is small (less than 5 MHz) and therefore the search would likely start with a small BW of 1.25 or 2.5 MHz. Furthermore, in new bands allocated only to S3G, a large BW of about 10-20 MHz is likely. The possible BWs for different frequency bands could be stored in a look up table in the mobile terminal. Alternatively, information about possible used BWs can be stored in the Subscriber Identity Module (SIM) card and thereby hard coded by the operator. Whatever procedure is used to perform the initial cell search, it is controlled by a control unit (CU) 110 of the mobile terminal as seen in FIG. 1.

As seen in FIG. 2, in step 201, the receiver is first adapted to one of the possible BWs by adapting the analog filters and digital filters (AF/DF) to the specific BWs. In step 202, the cell search is started by an attempt to detect the synchronization symbol (SCH). Methods for finding time synchronization is described, for example, in Minn. If a SCH is not found in step 203, the method returns to step 201. If a SCH is found in step 203, in step 204, then a coarse frequency correction is performed so as to perform coarse frequency synchronization $f_{coarse}$. The frequency error information is fed to the CU (seen in block 110 of FIG. 1) and the local oscillators are corrected. Then in step 205 the cyclic prefix length is estimated, which can be done by correlating the received signal with delayed replicas of the received signal, with the number of correlated samples corresponding to the candidate cyclic prefix length. In other words, as many correlations as possible cyclic prefixes exist in the system must be performed. The cyclic prefix length detection can be expressed as:

$$L_{CP} = \arg\max_{L_{CP} \in \text{allowed } CPs} \left( \left| \sum_{l} \sum_{m=0}^{L_{CP}-1} \hat{y}[d + lN_{TOT} - L_{CP} + m] \times \hat{y}^*[d + lN_{tot} - L_{CP} + N + m] \right| \right).$$

with N, $N_{tot}$, and $L_{CP}$ the length of the OFDM symbol without cyclic extensions, the length of the OFDM symbol with cyclic extensions, and the length of the cyclic prefix, respectively. $\hat{y}$ denotes the received signal corrected for the coarse frequency offset. d indicates the beginning of an OFDM symbol (main symbol, not cyclic extension) and is found during timing synchronization. The summation over l indicates that this operation is averaged over several symbols. The cyclic prefix length resulting in the highest correlation value is used as the candidate cyclic prefix. After the cyclic prefix is estimated, a fine frequency synchronization is performed in step 206, using the knowledge of the cyclic prefix length.

$$\hat{f}_f = -\frac{1}{2\pi} \arg\left( \sum_{l} \sum_{m=0}^{L_{CP}-1} \hat{y}[d + lN_{tot} - L_{CP} + m] \times \hat{y}^*[d + lN_{tot} - L_{CP} + N + m] \right).$$

The frequency error information is fed via the CU 110 to the front end receiver 102 of the mobile terminal. Once the mobile terminal is frequency and time synchronized with the cell, the cell ID must be detected in step 207, in CS unit 106, using techniques described, for example, in Minn and in Applicant's co-pending patent application Ser. No. 10/315, 710.

Finally, in step 208, by FFT processing and decoding the broadcast information, the mobile terminal, if allowed, will camp on the cell. In case the mobile terminal is not allowed to camp on the cell or if no timing match (SCH) is found for that BW, the front end receiver 102 is adapted to a new BW, such as the next probable BW in the particular frequency band, and the cell search procedure is started again, as controlled by the CU 110.

The first aspect of the present invention can further be extended as follows: In the event the mobile terminal is synchronized to the network, thus having time and frequency synchronization, and cell search is done for mobility reasons, the speed of the procedure for cell search can be increased by including information about the cyclic prefix length, in the cell ID. For example, in two (2) possible cyclic prefix scenarios, a cell ID below a certain number, for example, fifty (50) means a short cyclic prefix and above fifty (50) means a long cyclic prefix. In such a case the mobile terminal need only perform the following cell search steps:

1. Search for each carrier frequency, over probable BWs;
2. Find slot timing;
3. Detect cell ID and thereby receive cyclic prefix length information; and
4. Read BCH.

Different synchronization signals may be applicable depending on the bandwidth and other characteristics of a specific OFDM system. The reason for this is that a narrow-band transmission channel has less frequency diversity. Signals transmitted across a narrow-band channel are therefore more prone to be disturbed than signals transmitted across a wide-band channel. Possible differences between synchronization signals designed for narrow and wide-band channels, include, but are not limited to, bandwidth, number of synchronization symbols, and synchronization pattern. Because of the variety of synchronization signals, no single synchronization algorithm can be applied in the receiver of a mobile terminal/user equipment (UE), rather algorithms matched to all possible synchronization signals must be used. This procedure can be very time consuming. In order to reduce this time, a second aspect of the present invention is directed to the identification of the first critical system parameters that allow reduction, preferably one, of the possible synchronization signals.

The critical parameter includes, but is not limited to, system bandwidth and Inverse FFT (IFFT) size in the transmitter. System bandwidth and IFFT size can be identified by, among other things, measuring the power spectral density and exploiting cyclo-stationary properties of the received signal, respectively.

Once the system parameter is known the synchronization procedure only has to be performed for those synchronization signals that are possible for the identified critical system parameter.

Figure 3:
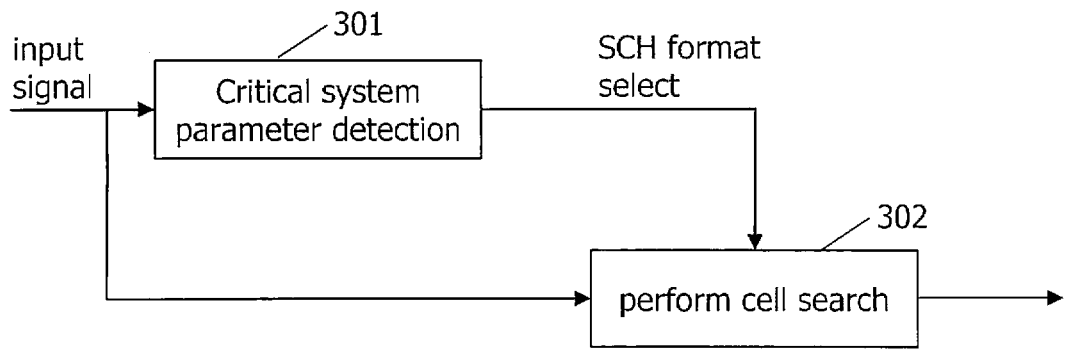
FIG. 3 is a block diagram of a mobile terminal capable identifying first critical system parameters that limit, preferably to one, the number of possible synchronization signals according to a second aspect of the present invention.

Referring to FIG. 3, the critical system parameter detection block 301 identifies a critical system parameter (e.g. IFFT size, bandwidth) and feeds this information (SCH format select) into the perform cell search 302 block. Based on SCH format select, the block perform cell search 302 uses the appropriate SCH signal with which to perform the cell search.

Figure 4:
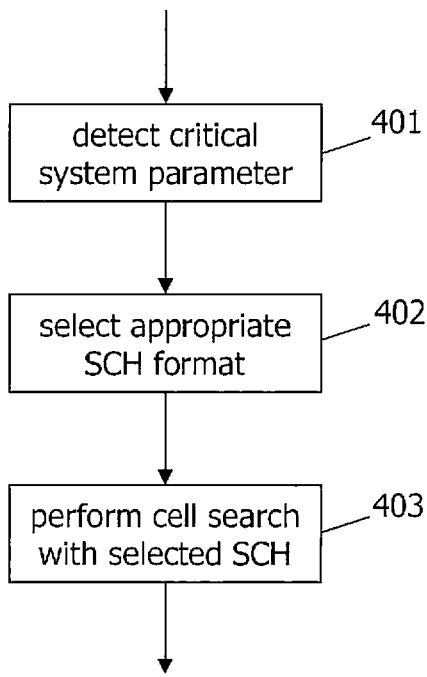
FIG. 4 is a flow chart of the procedure for identifying first critical system parameters that limit, prefererably to one, the number of possible synchronization signals in a second aspect of the present invention.

FIG. 4 illustrates the steps performed by the apparatus of FIG. 3. Once the critical system parameter has been detected in step 401, the appropriate SCH format is selected in step 402 and then the cell search is performed with the selected SCH in step 403.

In S3G, the synchronization signal may be different for the supported bandwidths, 1.25, 2.5, 5.0, 10.0 or 20.0 MHz. Different IFFT sizes are used to generate signals with the above bandwidths, 128, 256, 512, 1024, or 2048 for 1.25 MHz, 2.5 MHz, 5.0 MHz, 10.0 MHz, or 20.0 MHz, respectively. Identification of the system bandwidth or IFFT size then indicates which kind of synchronization signal is used. The kind of synchronization signal refers to how many OFDM symbols compose one synchronization symbol but also more detailed parameters such as sign pattern and the like.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of performing a cell search in an OFDM cellular telecommunications system having a certain number of bandwidth (BW) possibilities and a certain number of cyclic prefix possibilities, comprising the steps of:
    adapting a receiver front end in a mobile terminal/user equipment (UE) to a certain carrier frequency $f_0$ and BW, said BW including a certain number of BWs for the system;
    commencing a cell search;
    if slot timing found, performing a coarse frequency correction; estimating a cyclic prefix length;
    performing a frequency correction using the knowledge of the cyclic prefix;
    detecting a cell Identification (ID); and
    reading a broadcast channel.

2. The method of claim 1, wherein the search order over the different BWs is based on information from a history list.

3. The method of claim 1, wherein the search order over the different BWs is based on information about the current frequency band used.

4. The method of claim 3, wherein the frequency band is one selected from one on which the following standards is used: Global System for Mobile Communications (GSM), Wideband Code Division Multiple Access (WCDMA) or IS-95.

5. The method of claim 1, as implemented in a Super 3G mobile terminal.

6. An OFDM cellular telecommunications system having a certain number of bandwidth (BW) possibilities and a certain number of cyclic prefix possibilities, comprising:
    a mobile terminal/user equipment (UE) operable at a certain carrier frequency $f_0$ and BW, said BW including a certain number of BWs for the system;
    the mobile terminal/UE operable to commence a cell search;
    if slot timing found, perform a coarse frequency correction;
    estimate a cyclic prefix length;
    perform a frequency correction using the knowledge of the cyclic prefix;
    detect a cell ID; and
    read a broadcast channel.

7. The OFDM cellular telecommunications system of claim 6, adapted to order the search over the different BWs is based on information from a history list.

8. The OFDM cellular telecommunications system of claim 6, adapted to order a search over the different BWs is based on information about the current frequency band used.

9. The OFDM cellular telecommunications system of claim 8, wherein the frequency band is one selected from one on which the following standards is used: Global System for Mobile Communications (GSM), Wideband Code Division Multiple Access (WCDMA) or IS-95.

10. A mobile terminal/user equipment (UE) for use in an OFDM cellular telecommunications system having a means to facilitate a certain number of bandwidth possibilities and a certain number of cyclic prefix possibilities wherein information about cyclic prefix length for a specific cell is incorporated in a cell ID information, the mobile terminal/UE comprising a means adapted to utilize the cyclic prefix length information in the cell ID detected during the cell search procedure for detecting Cyclic Prefix (CP) for a specific cell.

* * * * *